US008599193B2

(12) United States Patent
Kim et al.

(10) Patent No.: US 8,599,193 B2

(45) Date of Patent: Dec. 3, 2013

(54) LIQUID CRYSTAL DISPLAY

(75) Inventors: Sunyoung Kim, Hwaseong-si (KR); Yongwon Jo, Bucheon-si (KR)

(73) Assignee: LG Display Co., Ltd., Seoul (KR)

(*) Notice: Subject to any disclaimer, the term of this patent is extended or adjusted under 35 U.S.C. 154(b) by 1000 days.

(21) Appl. No.: 12/645,478

(22) Filed: Dec. 22, 2009

(65) Prior Publication Data

US 2011/0025680 A1 Feb. 3, 2011

(30) Foreign Application Priority Data

Jul. 31, 2009 (KR) ........................ 10-2009-0070514

(51) Int. Cl.
*G06F 3/038* (2013.01)

(52) U.S. Cl.
USPC .......................................................... 345/214

(58) Field of Classification Search
USPC .......................................................... 345/214
See application file for complete search history.

(56) References Cited

U.S. PATENT DOCUMENTS

2006/0164365 A1* 7/2006 Huang et al. .................... 345/98
2009/0262147 A1* 10/2009 Yoshida ........................ 345/690
2010/0207960 A1* 8/2010 Kimpe et al. ................ 345/618

FOREIGN PATENT DOCUMENTS

KR 10-2005-0066749 A 6/2005
KR 10-2006-0000624 A 1/2006
KR 10-2006-0077471 A 7/2006
KR 10-2006-0077476 A 7/2006
KR 10-2008-0047081 A 5/2008

* cited by examiner

*Primary Examiner* — Latanya Bibbins

(74) *Attorney, Agent, or Firm* — Birch, Stewart, Kolasch & Birch, LLP

(57) ABSTRACT

A liquid crystal display including a first over-driving (OD) compensation unit compensating R data at a first OD rate; a second OD compensation unit compensating G data at a second OD rate; and a third OD compensation unit compensating B data at a third OD rate, where the second OD rate is higher than the first OD rate and the third OD rate.

17 Claims, 8 Drawing Sheets

FIG. 5

White

| | 0 | 63 | 127 | 191 | 255 |
|---|---|---|---|---|---|
| 0 | | 4. 05 | 4. 15 | 3. 97 | 4. 24 |
| 63 | 4. 47 | | 4. 04 | 4. 32 | 4. 13 |
| 127 | 4. 61 | 3. 97 | | 3. 6 | 3. 72 |
| 191 | 4. 87 | 4. 28 | 3. 92 | | 3. 15 |
| 255 | 5. 43 | 4. 66 | 3. 76 | 3. 77 | |

Average : 4. 16ms

FIG. 6

Red

| | 0 | 63 | 127 | 191 | 255 |
|---|---|---|---|---|---|
| 0 | | 3. 77 | 3. 81 | 3. 65 | 4. 6 |
| 63 | 4. 25 | | 3. 74 | 3. 89 | 4. 56 |
| 127 | 4. 1 | 3. 73 | | 3. 5 | 4. 15 |
| 191 | 4. 43 | 4 | 3. 73 | | 3. 65 |
| 255 | 5. 08 | 4. 44 | 3. 74 | 3. 89 | |

Average : 4. 04ms

FIG. 7

Green

| | 0 | 63 | 127 | 191 | 255 |
|---|---|---|---|---|---|
| 0 | | 4.15 | 4.25 | 4.07 | 4.64 |
| 63 | 4.54 | | 4.14 | 4.2 | 4.45 |
| 127 | 4.71 | 4.03 | | 3.74 | 3.96 |
| 191 | 4.96 | 4.42 | 4.04 | | 3.4 |
| 255 | 5.61 | 4.82 | 3.93 | 4.02 | |

Average : 4.30ms

FIG. 8

Blue

| | 0 | 63 | 127 | 191 | 255 |
|---|---|---|---|---|---|
| 0 | | 4.11 | 4.07 | 3.88 | 4.33 |
| 63 | 4.08 | | 3.94 | 3.95 | 4.25 |
| 127 | 4.4 | 3.7 | | 3.6 | 3.79 |
| 191 | 4.71 | 4.17 | 3.88 | | 3.17 |
| 255 | 5.31 | 4.66 | 3.82 | 2.87 | |

Average : 4.03ms

LIQUID CRYSTAL DISPLAY

CROSS REFERENCE TO RELATED APPLICATIONS

This application claims the benefit of Korea Patent Application No. 10-2009-0070514 filed on Jul. 31, 2009, which is incorporated herein by reference as if fully set forth herein.

BACKGROUND OF THE INVENTION

1. Field of the Invention

This document relates to a liquid crystal display (LCD), and more particularly, to an LCD for compensating for a response time difference among RGB data in an LCD panel and a response time compensating method thereof.

2. Discussion of the Related Art

The use of liquid crystal display (LCDs) in various products has become more common due to favorable characteristics such as light weight, thin shape and low power consumption. LCDs are used for portable computers such as a notebook PC, automated office appliances, audio/video devices, indoor and outdoor advertisement display apparatuses, etc. LCDs control an electric field applied to a liquid crystal layer to module light emitted from a backlight unit so as to display images.

Liquid crystal has a long response time due to LCD properties such as viscosity and elasticity, as represented by expressions 1 and 2.

$$\tau_r \propto \frac{\gamma d^2}{\Delta\varepsilon|V_a^2 - V_F^2|} \quad \text{[Expression 1]}$$

Here, $\tau_r$ represents rising time when a voltage is applied to the liquid crystal, Va denotes the applied voltage, $V_F$ represents Freederick transition voltage at which liquid crystal molecules start a tilting motion, d denotes a cell gap of a liquid crystal cell, and $\gamma$ represents rotational viscosity of the liquid crystal molecules.

$$\tau_f \propto \frac{\gamma d^2}{K} \quad \text{[Expression 2]}$$

Here, $\tau_f$ represents falling time when the liquid crystal is restored to the original position according to elastic recovery of the liquid crystal after the voltage applied to the liquid crystal is off and K denotes modulus of elasticity of the liquid crystal.

When a data voltage VD is changed, as shown in FIG. 1, display luminance corresponding to the data voltage VD does not reach a desired luminance due to the slow response time of the liquid crystal. Consequently, the next frame of the conventional LCD is processed before a voltage charged in liquid crystal cells reaches a desired voltage, as shown in FIG. 1, and thus motion blur may generate when video data is displayed on the LCD.

To reduce the long response speed of the conventional LCD, the conventional LCD uses an over-driving (OD) compensation method that modulates a data voltage according to whether data is changed or not to increase the response time has been proposed. The conventional OD compensation method will now be described with reference to FIG. 2.

Referring to FIG. 2, the conventional OD compensation method modulates an input data voltage VD into a modulated data voltage MVD higher than the input data voltage VD and applies the modulated data voltage MVD to a liquid crystal cell such that the luminance of the liquid crystal cell can reach a target luminance MBL within a desired time. The conventional OD compensation method increases $|V_a^2 - V_F^2|$ in expression 1 based on whether data is changed in order to obtain the target luminance MBL within a single frame period. Accordingly, an LCD employing the conventional OD compensation method can compensate for long response time of liquid crystal through modulation of a data voltage to improve the picture quality of moving images. The conventional OD compensation method compares data of a previous frame with data of the current frame and sets modulation data in consideration of a variation between the data of the previous frame and the data of the current frame.

FIG. 3 is a block diagram of a conventional OD compensation circuit.

Referring to FIG. 3, the conventional OD compensation unit includes first and second frame memories 33*a* and 33*b* storing data received from a data input bus 32 and a look-up table 34 for modulating the data.

The first and second frame memories 33*a* and 33*b* alternately store data frame by frame in synchronization with a pixel clock signal and alternately output the stored data to provide previous frame data, that is, (n−1)th frame data Fn−1, to the look-up table 34.

The look-up table 34 selects previously set modulation data MRGB, as shown in Table 1, using nth frame data Fn and the (n−1)th frame data Fn−1 received from the first and second frame memories 33*a* and 33*b* as addresses to modulate the data. The look-up table 34 includes a read only memory (ROM) and a memory control circuit.

TABLE 1

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 2 | 3 | 4 | 5 | 6 | 7 | 9 | 10 | 12 | 13 | 14 | 15 | 15 | 15 | 15 |
| 1 | 0 | 1 | 3 | 4 | 5 | 6 | 7 | 8 | 10 | 12 | 13 | 14 | 15 | 15 | 15 | 15 |
| 2 | 0 | 0 | 2 | 4 | 5 | 6 | 7 | 8 | 10 | 12 | 13 | 14 | 15 | 15 | 15 | 15 |
| 3 | 0 | 0 | 1 | 3 | 5 | 6 | 7 | 8 | 10 | 11 | 13 | 14 | 15 | 15 | 15 | 15 |
| 4 | 0 | 0 | 1 | 3 | 4 | 6 | 7 | 8 | 9 | 11 | 12 | 13 | 14 | 15 | 15 | 15 |
| 5 | 0 | 0 | 1 | 2 | 3 | 5 | 7 | 8 | 9 | 11 | 12 | 13 | 14 | 15 | 15 | 15 |
| 6 | 0 | 0 | 1 | 2 | 3 | 4 | 6 | 8 | 9 | 10 | 12 | 13 | 14 | 15 | 15 | 15 |
| 7 | 0 | 0 | 1 | 2 | 3 | 4 | 5 | 7 | 9 | 10 | 11 | 13 | 14 | 15 | 15 | 15 |
| 8 | 0 | 0 | 1 | 2 | 3 | 4 | 5 | 6 | 8 | 10 | 11 | 12 | 14 | 15 | 15 | 15 |
| 9 | 0 | 0 | 1 | 2 | 3 | 4 | 5 | 6 | 7 | 9 | 11 | 12 | 13 | 14 | 15 | 15 |
| 10 | 0 | 0 | 1 | 2 | 3 | 4 | 5 | 6 | 7 | 8 | 10 | 12 | 13 | 14 | 15 | 15 |
| 11 | 0 | 0 | 1 | 2 | 3 | 4 | 5 | 6 | 7 | 8 | 9 | 11 | 13 | 14 | 15 | 15 |

TABLE 1-continued

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 12 | 0 | 0 | 1 | 2 | 3 | 4 | 5 | 6 | 7 | 8 | 9 | 10 | 12 | 14 | 15 | 15 |
| 13 | 0 | 0 | 1 | 2 | 3 | 3 | 4 | 5 | 6 | 7 | 8 | 10 | 11 | 13 | 15 | 15 |
| 14 | 0 | 0 | 1 | 2 | 3 | 3 | 4 | 5 | 6 | 7 | 8 | 9 | 11 | 12 | 14 | 15 |
| 15 | 0 | 0 | 0 | 1 | 2 | 3 | 3 | 4 | 5 | 6 | 7 | 8 | 9 | 11 | 13 | 15 |

In table 1, the leftmost row represents data of the previous frame Fn−1 and the uppermost column represents data of the current frame Fn.

The nth frame data Fn is stored in the first frame memory 33_a_ and, simultaneously, provided to the look-up table 34 in synchronization with the same pixel clock signal, as represented by a solid line in FIG. 3, during an nth frame period. Simultaneously, the second frame memory 33_b_ supplies the (n−1)th frame data Fn−1 to the look-up table 34 during the nth frame period.

The (n+1)th frame data Fn+1 is stored in the second frame memory 33_b_ and, simultaneously, provided to the look-up table 34 in synchronization with the same pixel clock signal, as represented by a dotted line in FIG. 3, during an (n+1)th frame period. Simultaneously, the first frame memory 33_a_ supplies the nth frame data Fn to the look-up table 34 during the (n+1)th frame period.

Even if red (R) data, green (G) data and blue (B) data are modulated at the same OD rate in an LCD, the R data, the G data and the B data may have different response times due to a transmissivity difference and an absorption difference among RGB color filters. However, the conventional OD compensation method cannot make a) response time in an R sub-pixel, b) response time in a G sub-pixel and c) response time in a B sub-pixel equal to one another because the conventional OD compensation method modulates RGB data, as shown in FIG. 1, using the same look-up table. Consequently, although the conventional OD compensation method can increase the OD rate to improve the response time of liquid crystal, the conventional OD compensation method may cause color distortion at a boundary between a background and a moving object when color video data is displayed on an LCD due to a response time differences among RGB data.

SUMMARY OF THE INVENTION

This document describes an LCD for compensating for a response time difference among RGB data when response characteristic of liquid crystal is improved through an OD compensation method to enhance moving image display quality and a response time compensating method thereof.

According to an aspect of this document, there is provided a liquid crystal display including a first over-driving (OD) compensation unit compensating R data at a first OD rate; a second OD compensation unit compensating G data at a second OD rate; and a third OD compensation unit compensating B data at a third OD rate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5, 6, 7 and 8 are experimental results showing a response time difference among RGB data in an LCD employing an OD compensation method according to an embodiment of this document;

DETAILED DESCRIPTION OF THE PREFERRED EMBODIMENTS

Embodiments of the invention will now be described more fully with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Embodiments of this document will now be explained with reference to FIGS. 4 through 11.

Figure 1:
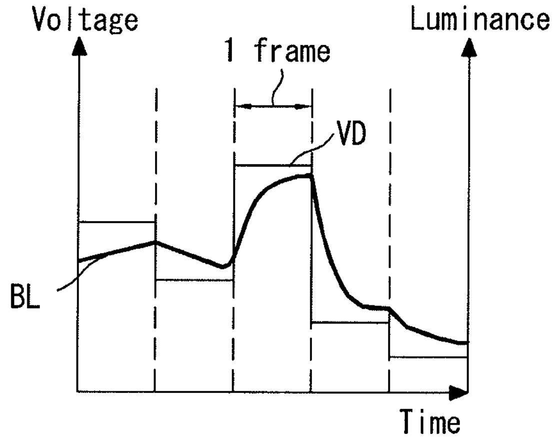
FIG. 1 (RELATED ART)
FIG. 1 is a graph showing a luminance variation according to data in a conventional LCD.
Figure 2:
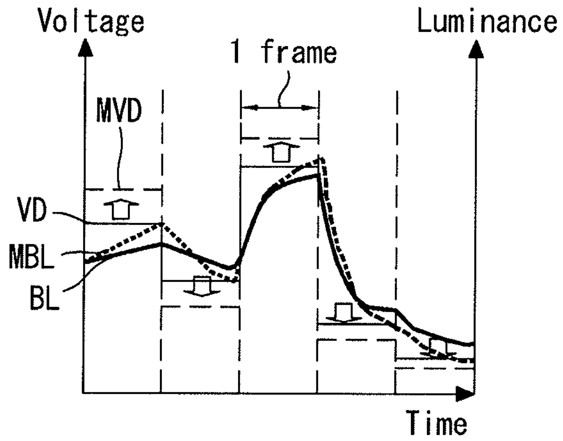
FIG. 2 (RELATED ART)
FIG. 2 shows a conventional OD compensation method.
Figure 3:
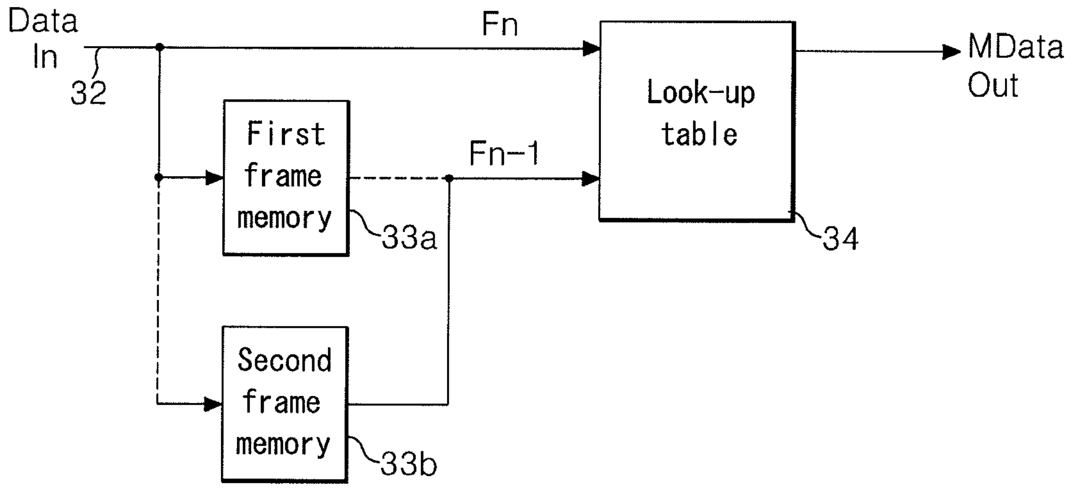
FIG. 3 (RELATED ART)
FIG. 3 is a block diagram of a conventional OD compensation unit.
Figure 4:
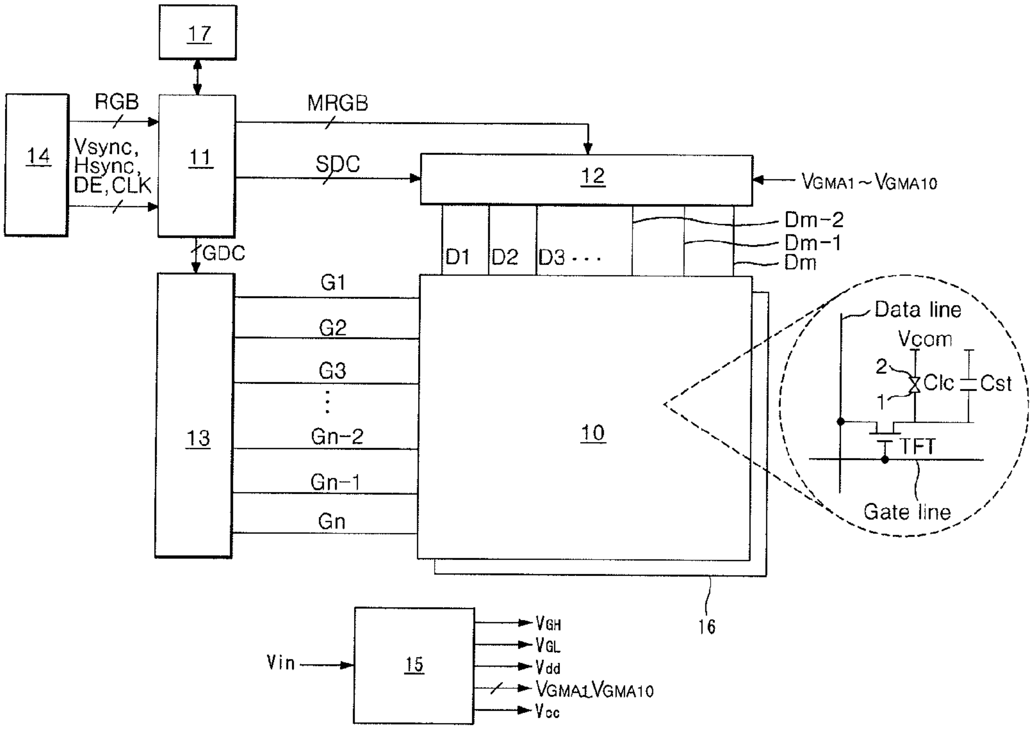
FIG. 4 is a block diagram of an LCD according to an embodiment of this document.

Referring to FIG. 4, an LCD according to an embodiment of this document includes an LCD panel 10, a backlight unit 16 arranged under the LCD panel 10, a data driving circuit 12 connected to data lines D1 through Dm of the LCD panel 10, a gate driving circuit 13 connected to gate lines G1 through Gn of the LCD panel 10, a timing controller 11 for controlling the data driving circuit 12 and the gate driving circuit 13, a module power supply 15 generating driving voltages of the LCD panel 10, and an over-driving (OD) compensation unit 17.

The LCD panel 10 may include an upper glass substrate and a lower glass substrate opposite to each other and having a liquid crystal layer interposed between them. The LCD panel 10 may include a pixel array for displaying video data. The pixel array may include thin film transistors (TFTs) respectively formed at intersections of the data lines D1 through Dm and the gate lines G1 through Gn and pixel electrodes 1 respectively connected to the TFTs. Liquid crystal cells Clc of the pixel array may be driven by a voltage difference between the pixel electrodes 1 charging a data voltage through the TFTs and a common electrode 2 to which a common voltage Vcom may be applied to adjust the transmissivity of light received from the backlight unit 16 so as to display an image corresponding to video data. A black matrix, a color filter and the common electrode may be formed on the upper glass substrate of the LCD panel 10. Polarizers may be respectively attached to the upper and lower glass substrates of the LCD panel 10 and alignment films for setting a pre-tilt angle of liquid crystal are formed on the upper and lower glass substrates of the LCD panel 10.

The common electrode 2 may be formed on the upper glass substrate in a vertical field driving mode such as a twisted nematic (TN) mode and a vertical alignment (VA) mode. The common electrode 2 may be formed together with the pixel electrodes 1 on the lower glass substrate in a horizontal field driving mode such as an in-plane switching (IPS) mode and a fringe field switching (FFS) mode.

A liquid crystal mode of the LCD panel 10 may be any mode in addition to the TN mode, the VA mode, the IPS mode and the FFS mode. Further, the LCD of this document may be implemented in any form such as a transmission type LCD, a transflective LCD, and a reflective type LCD. The transmission type LCD and the transflective LCD may use the backlight unit 16. The backlight unit 16 may be implemented as a direct light backlight unit or an edge type backlight unit.

The data driving circuit 12 includes a plurality of source drive integrated circuits (ICs). The source drive ICs sample and latch OD compensated digital video data MRGB received from the timing controller 11 in response to a data control signal SDC supplied from the timing controller 11 to convert the OD compensated digital video data MRGB into parallel data. The source drive ICs convert the parallel digital video data MRGB into analog gamma compensated voltages by using positive/negative gamma reference voltages $V_{GMAO1}$ through $V_{GMA10}$ supplied from the module power supply 15. Further, the source drive ICs output positive/negative analog video data voltages to be charged in the liquid crystal cells to the data lines D1 through Dm. In addition, the source drive ICs supply the positive/negative analog video data voltages to the data lines D1 through Dm while inverting the polarities of the positive/negative analog video data voltages under the control of the timing controller 11.

The gate driving circuit 13 includes a plurality of gate drive ICs. The gate drive ICs include shift registers for sequentially shifting a gate driving voltage in response to a gate control signal GDC supplied from the timing controller 11 and sequentially provide a gate pulse (or scan pulse) to the gate lines G1 through Gn.

The timing controller 11 inputs RGB digital video data to the OD compensation unit 17 and transmits the OD compensated RGB digital video data MRGB received from the OD compensation unit 17 to the source drive ICs via a mini low voltage differential signaling (LVDS) interface method. Further, the timing controller 11 receives timing signals such as a vertical synchronization signal Vsync, a horizontal synchronization signal Hsync, a data enable signal DE and a dot clock signal CLK from a system board 14. In addition, the timing controller 11 generates the data control signal SDC for controlling operation timing of the source drive ICs and the gate control signal GDC for controlling operation timing of the gate drive ICs using the timing signals Vsync, Hsync, DE and CLK. The timing controller 11 can multiply the frequencies of the gate control signal GDC and the data control signal SDC into 60×i Hz (i is a positive integer equal to or greater than 2) such that digital video data input at a frame frequency of 60 Hz can be displayed at a frame frequency of 60×i Hz in the pixel array of the LCD panel 10.

The data control signal SDC may include a source start pulse signal SSP, a source sampling clock signal SSC, a source output enable signal SOE and a polarity control signal POL. The source start pulse signal SSP controls data sampling start time of the data driving circuit 12. The source sampling clock signal SSC controls a data sampling operation in the source drive ICs based on a rising or falling edge. If the digital video data RGB to be input to the source drive ICs is transmitted according to a mini LVDS interface standard, there may be no need to input the source start pulse signal SSP and the source sampling clock signal SSC to the source drive ICs. The polarity control signal POL inverts the polarities of data voltages output from the data driving circuit 12 for every N horizontal periods (N is a positive integer). The source drive ICs a) supply a charge share voltage or the common voltage Vcom to the data lines D1 through Dm in response to pulses of the source output enable signal SOE when the polarities of data voltages provided to the data lines D1 through Dm are changed, and b) provide the data voltage to the data lines D1 through Dm during a logic low period of the source output enable signal SOE. The charge share voltage provided by the source drive ICs corresponds to an average voltage of neighboring data lines to which data voltages having opposite polarities are respectively supplied.

The gate control signal GDC may include a gate start pulse signal GSP, a gate shift clock signal GSC and a gate output enable signal GOE. The gate start pulse signal GSP controls timing of the first gate pulse. The gate shift clock signal GSC shifts the gate start pulse signal GSP. The gate output enable signal GOE controls output timing of the gate driving circuit 13.

The system board 14 transmits the digital video data RGB input from a broadcasting receiving circuit or an external video source to the timing controller 11 through an LVDS interface or a transmission minimized differential signaling (TMDS) interface transmission circuit. Further, the system board 14 transmits the timing signals such as the vertical synchronization signal Vsync, the horizontal synchronization signal Hsync, the data enable signal DE and the dot clock signal CLK to the timing controller 11. The system board 14 includes a graphic processing circuit such as a scaler that interpolates the digital video data RGB input from the broadcasting receiving circuit or the external video source such that the resolution of the digital video data RGB corresponds to the resolution of the LCD panel 10 and performs signal interpolation, and a power supply circuit for generating a voltage Vin to be supplied to the module power supply 15.

The module power supply 15 controls the voltage Vin supplied from the power supply circuit of the system board 14 to generate the driving voltages of the LCD panel 10. The driving voltages of the LCD panel 10 include a high source voltage Vdd lower than 8V, a logic source voltage Vcc corresponding to approximately 3.3V, a gate high voltage VGH higher than 15V, a gate low voltage VGL lower than −3V, the common voltage in the range of 7V to 8V, and the positive/negative gamma reference voltages $V_{GMAO1}$~$V_{GMA1O}$. The module power supply 15 divides the high source voltage Vdd using a voltage-dividing circuit including a resistor string to generate the positive/negative gamma reference voltages $V_{GMAO1}$~$V_{GMA1O}$.

The OD compensation unit 17 respectively modulates R data, G data and B data at different OD rates in consideration of a response time difference among the R data, G data and B data (see, e.g., experimental results as shown in FIGS. 5, 6, 7 and 8) to make the R data, G data and B data have the same response time. The OD compensation unit 17 respectively modulates the R data, G data and B data at different OD rates modulates to generate the OD compensated RGB digital video data MRGB and supplies the OD compensated RGB digital video data MRGB to the timing controller 11. To achieve this, the OD compensation unit 17 may be implemented as circuits shown in FIGS. 9, 10 and 11. The OD compensation unit 17 may be embedded in the timing controller 11 or mounted on the system board 14. Further, the OD compensation unit 17 may be arranged between the system board 14 and the timing controller 11 or between the timing controller 11 and the data driving circuit 12.

FIGS. 5, 6, 7 and 8 are experimental results showing a response time difference among RGB data in an LCD employing an OD compensation method according to an embodiment of this document. For these experiments, gray scale values of data input to an LCD panel sample were changed based on 5 (the gray scale value of a previous frame)×5 (the gray scale value of the current frame) gray scale tables, as shown in FIGS. 5, 6, 7 and 8, and the voltage of the data was modulated at a predetermined OD rate.

Further, gray-to-gray was measured according to luminance detected with a photo-sensor mounted on the LCD sample to obtain response time of each of white (W) data, red (R) data, green (G) gate and blue (B) data. In FIGS. 5, 6, 7 and 8, the leftmost column represents a gray scale value of data of the previous frame Fn−1 and the uppermost row represents a gray scale value of data of the current frame Fn.

Referring to FIG. 5, when a white gray scale value of the data is '63' in the previous frame and is changed to '127', '191' and '255' in the current frame, time periods respectively required for the W gray scale value to reach '127', '191' and '255' from '63' are measured as 4.04 ms, 4.32 ms and 4.13 ms. When response time with respect to each gray scale variation in the 5×5 gray scale table of FIG. 5 is measured, the average response time of the white gray scale variations is 4.16 ms.

Referring to FIG. 6, when a red gray scale value of the data is '63' in the previous frame and is changed to '127', '191' and '255' in the current frame, time periods respectively required for the red gray scale value to reach '127', '191' and '255' from '63' are measured as 3.74 ms, 3.89 ms and 4.56 ms. When response time with respect to each gray scale variation in the 5×5 gray scale table of FIG. 6 is measured, the average response time of the red gray scale variations is 4.04 ms.

Referring to FIG. 7, when a green gray scale value of the data is '63' in the previous frame and is changed to '127', '191' and '255' in the current frame, time periods respectively required for the gray scale value to reach '127', '191' and '255' from '63' are measured as 4.14 ms, 4.2 ms and 4.45 ms. When response time with respect to each gray scale variation in the 5×5 gray scale table of FIG. 7 is measured, the average response time of the green gray scale variations is 4.30 ms.

Referring to FIG. 8, when a blue gray scale value of the data is '63' in the previous frame and is changed to '127', '191' and '255' in the current frame, time periods respectively required for the gray scale value to reach '127', '191' and '255' from '63' are measured as 3.94 ms, 3.95 ms and 4.25 ms. When response time with respect to each gray scale variation in the 5×5 gray scale table of FIG. 8 is measured, the average response time of the blue gray scale variations is 4.03 ms.

As can be seen from the experimental results shown in FIGS. 5, 6, 7 and 8, the average response time of white gray scale variation corresponds to an average of a) the average response time of red scale variation, b) the average response time of green scale variation, and c) the response time of blue scale variation. The average response time of green scale variation is longer than the response time of the white scale variation, the average response time of red scale variation and the average response time of blue scale variation by approximately 0.26 to 0.27 ms. The average response time of red scale variation is similar to that of blue scale variation.

In the experimental results shown in FIGS. 5, 6, 7 and 8, a degree of blur of the LCD was measured based on a motion picture response time (MPRT). The MPRT became short if a time required to reach the next gray scale from a previous gray scale was short. Further, the MPRT became long when the time required to reach the next gray scale from the previous gray scale was long.

An embodiment of the invention sets the OD rate of G data such that the response time of the G data becomes identical or at least very close to the response time of R data and/or the response time of B data based on the experimental results shown in FIGS. 5, 6, 7 and 8 in order to improve the MPRT. In another embodiment of the invention, the OD rate of the R data and/or the OD rate of the B data are reduced and/or the OD rate of the G data is increased by a predetermined value in order to maintain the MPRT at a predetermined level and improve color distortion at a boundary, which occurs during OD compensation. An OD rate (%) is defined as the ratio of OD voltage (e.g., a voltage for increasing response time when gray scale is changed from an initial luminance A to luminance B (target luminance)) to a reference data voltage (e.g., a reference voltage of the target luminance B). For example, when the initial luminance A is '0' and the target luminance B is '100', a 10% OD ratio corresponds to an OD voltage that makes luminance '110' instead of '100' for increasing response time. Similarly, a 20% OD ratio corresponds to an OD voltage that makes luminance '120' instead of '100' for increasing response time.

Figure 9:
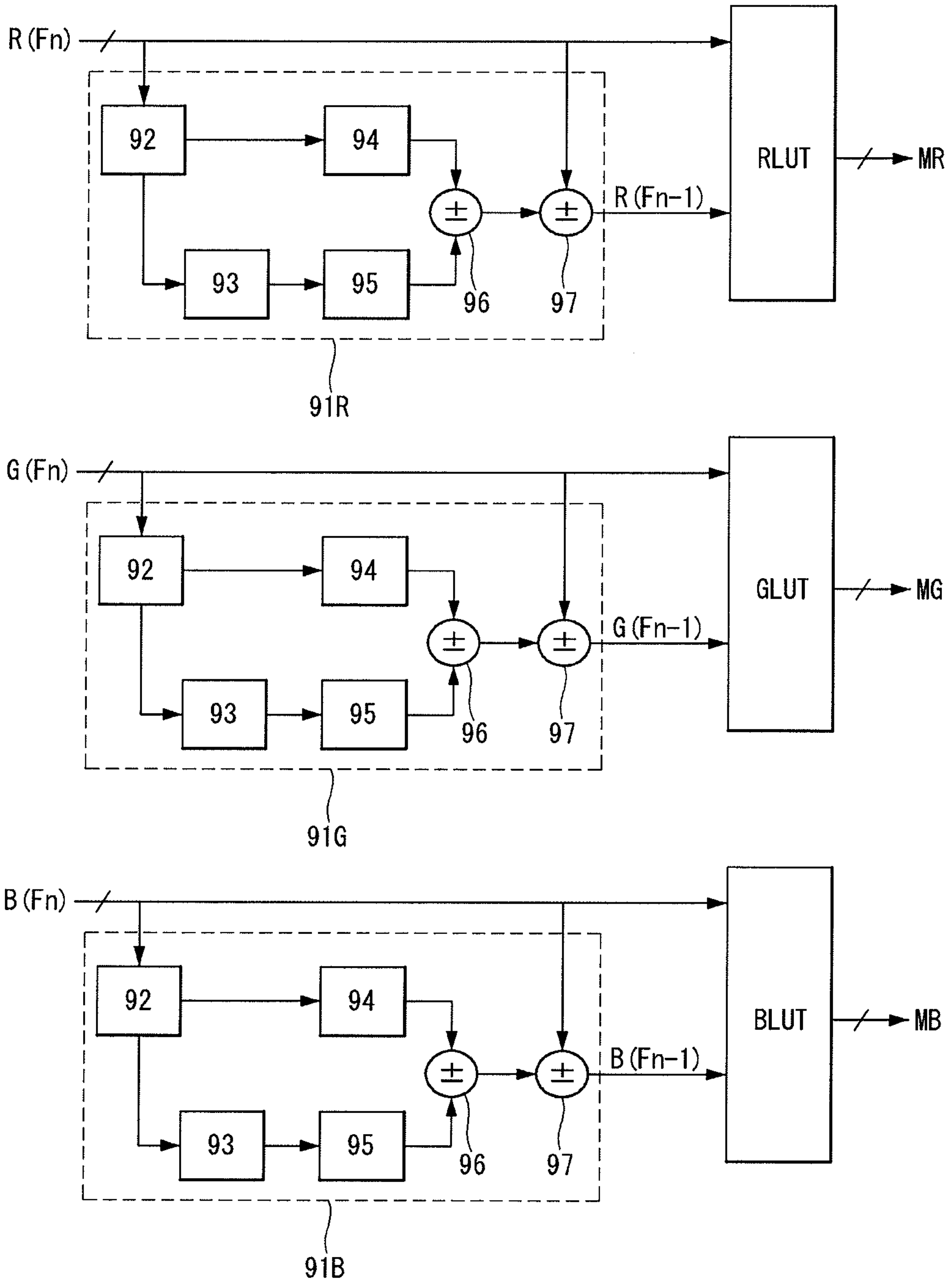
FIG. 9 shows an OD compensation unit illustrated in FIG. 4 according to a first embodiment of this document.

FIG. 9 shows the OD compensation unit 17 according to a first embodiment of this document.

Referring to FIG. 9, the OD compensation unit 17 includes an R modulator, a G modulator and a B modulator. The R modulator compresses and decompresses R data R(Fn−1) of a previous frame by using a data compression and decompression unit 91R and modulates the R data through a look-up table RLUT. The data compression and decompression unit 91R includes a data compressor 92, a frame memory 93, first and second data decompression units 94 and 95, a first operation unit 96, and a second operation unit 97. The data compressor 92 compresses R data using a compression algorithm such as a block truncation coding (BTC) algorithm or a compressed over-driving (COD) algorithm and supplies the compressed R data to the frame memory 93 and the first data decompression unit 94. The frame memory 93 stores the R data compressed by the data compressor 92, and thus the capacity of the frame memory 93 becomes smaller than the capacity when the frame memory stores uncompressed R data. The R data R(Fn−1) of the previous frame, output from the frame memory 93, is provided to the second data decompression unit 95. The first data decompression unit 94 decompresses the R data compressed by the data compressor 92 through a decompression algorithm to generate R data of the current frame and provides the R data of the current frame to the first operation unit 96. The second data decompression unit 95 decompresses the compressed R data of the previous frame, output from the frame memory 93, through a decompression algorithm and provides the decompressed R data to the first operation unit 96. The first operation unit 96 compares the R data of the current frame, received from the first data decompression unit 94, with the R data of the previous frame, received from the second data decompression unit 95, and provides a difference between the R data of the previous frame and the R data of the current frame to the second operation unit 97. The second operation unit 97 adds or subtracts the difference received from the first operation unit 96 to or from uncompressed R data R(Fn) of the current frame and outputs the R data R(Fn−1) of the previous frame. The second operation unit 97 adds the output of the first operation unit 96 to the R data of the current frame when the R data of the current frame becomes greater than the R data of the previous frame and subtracts the output of the first operation unit 96 from the R data of the current frame when the R data of the current frame becomes smaller than the R data of the previous frame. The look-up table RLUT stores R data modulation values set according to the difference between the R data of the previous frame and the R data of the current frame. The look-up table RLUT outputs modulated data MR that is modulated with a modulation value selected using the R data R(Fn) of the current frame and the R data R(Fn−1) of the previous frame as addresses.

The G modulator compresses and decompresses G data G(Fn−1) of the previous frame by using a data compression and decompression unit 91G and modulates the G data through a look-up table GLUT. The data compression and decompression unit 91G performs data compression and decompression operations through the data compressor 92, the frame memory 93, the first and second data decompression units 94 and 95, the first operation unit 92 and the second operation unit 97 to output the G data G(Fn−1) of the previous frame. The look-up table GLUT stores G data modulation values set according to a difference between the G data of the previous frame and G data of the current frame. The look-up table GLUT outputs modulated data MG that is modulated with a modulation value selected using the G data G(Fn) of the current frame and the G data G(Fn−1) of the previous frame as addresses.

The B modulator compresses and decompresses B data G(Fn−1) of the previous frame by using a data compression and decompression unit 91B and modulates the B data through a look-up table BLUT. The data compression and decompression unit 91B performs data compression and decompression operations through the data compressor 92, the frame memory 93, the first and second data decompression unit 94 and 95, the first operation unit 92 and the second operation unit 97 to output the B data B(Fn−1) of the previous frame. The look-up table BLUT stores B data modulation values set according to a difference between the B data of the previous frame and B data of the current frame. The look-up table BLUT outputs modulated data MB that is modulated with a modulation value selected using the B data B(Fn) of the current frame and the B data B(Fn−1) of the previous frame as addresses.

The data compression and decompression units 91R, 91G and 91B of the R modulator, the G modulator and the B modulator can be modified in various manners. For example, the data compression and decompression units 91R, 91G and 91B can use compression algorithms and circuits disclosed in Korean Patent Application Nos. 2003-98100, 2004-49541, 2004-116342, 2004-116347 and 2006-116974, the entire contents of each of which are incorporated herein by reference.

OD modulation methods of the R modulator, the G modulator and the B modulator satisfy the following expressions 3, 4 and 5.

$$Fn(R,G,B)<Fn-1(R,G,B)\rightarrow Fn(MR,MG,MB)<Fn(R,G,B) \quad \text{[Expression 3]}$$

$$Fn(R,G,B)=Fn-1(R,G,B)\rightarrow Fn(MR,MG,MB)=Fn(R,G,B) \quad \text{[Expression 4]}$$

$$Fn(R,G,B)>Fn-1(R,G,B)\rightarrow Fn(MR,MG,MB)>Fn(R,G,B) \quad \text{[Expression 5]}$$

It can be known from expressions 3, 4 and 5 that R data, G data and B data are independently OD-modulated. The independently modulated data MR, MG and MB is greater than the data of the current frame Fn if the pixel data values of the modulated data MR, MG and MB in the previous frame Fn−1 become greater than the pixel data values in the current frame Fn in the same pixel. Further, the independently modulated data MR, MG and MB is smaller than the data of the current frame Fn is the pixel data values in the previous frame Fn−1 becomes smaller than the pixel data values in the current frame Fn in the same pixel. The OD rate of the G data is set to be higher than the OD rates of the R data and the B data. The OD rate of the R data is set to identical to the OD rate of the B data. For example, a modulation value of the G data can be set to an OD rate in the range of 15% to 20% and modulation values of the R data and B data can be set to an OD rate in the range of 10% to 15%.

Figure 10:
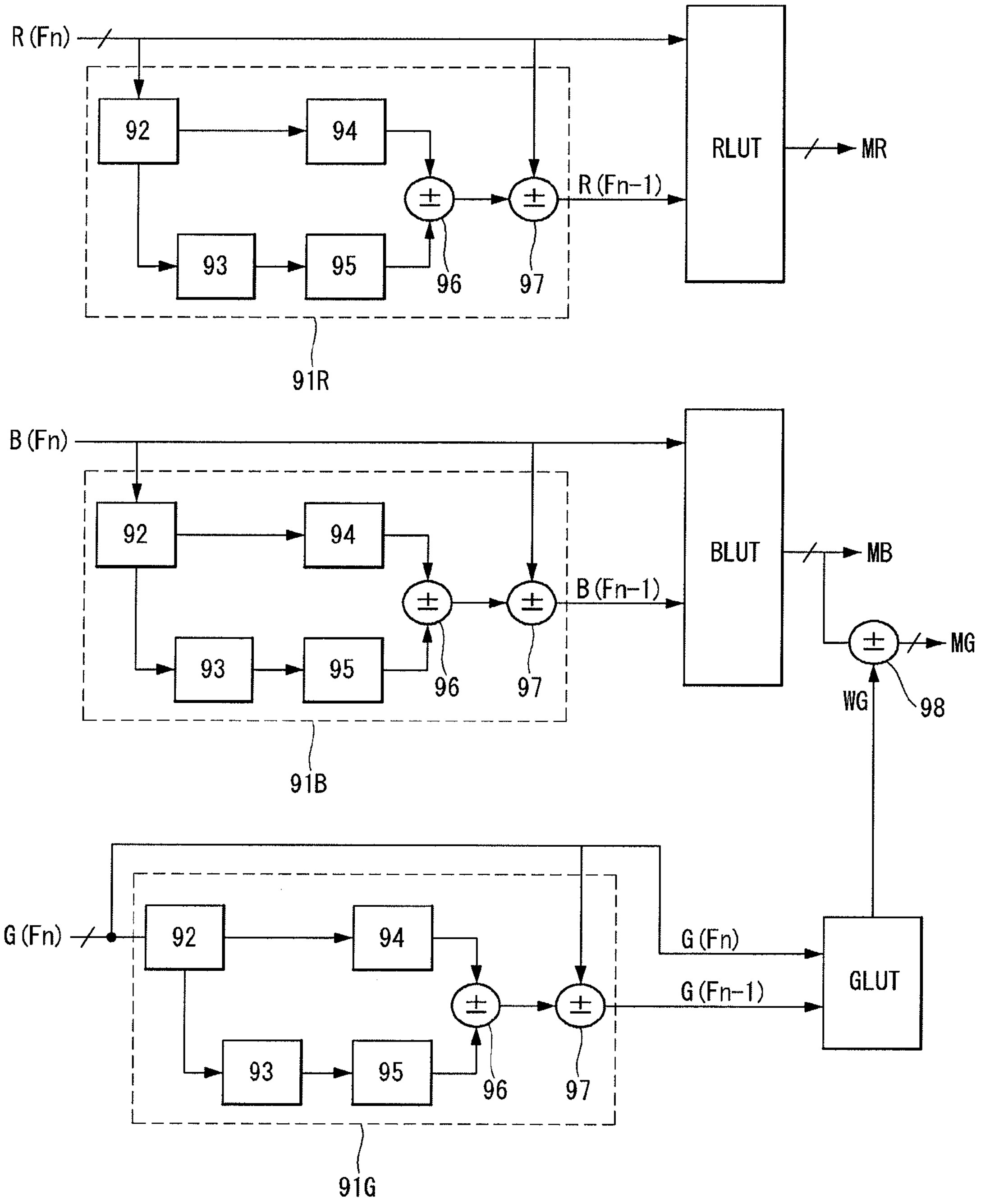
FIG. 10 shows the OD compensation unit illustrated in FIG. 4 according to a second embodiment of this document.

FIG. 10 illustrates the OD compensation unit 17 according to a second embodiment of this document.

Referring to FIG. 10, the OD compensation unit 17 includes an R modulator, a G modulator and a B modulator.

The data compression and decompression units 91R, 91G and 91B of the R, G and B modulators are identical to those of the R, G and B modulators illustrated in FIG. 9.

The look-up tables RLUT and BLUT of the R and B modulators stores modulation values of predetermined OD rates according to a gray scale variation between previous frame data and the current frame data. On the other hand, the look-up table GLUT of the G modulator stores modulation values selected using the previous frame data and the current frame data as addresses. Here, the modulation values are set as difference values having a small number of bits, which compensate for a response time difference between the G data and the R data or B data in the same gray scale variation. The difference values correspond to response time differences among R data, G data and B data shown in FIGS. 5, 6, 7 and 8. For example, each of the difference values can be set to a modulation value corresponding to an OD rate in the range of 1% to 5%, which is added to or subtracted from the OD rate of R data or B data. Accordingly, the capacity of the look-up table GLUT of the G modulator is smaller than the look-up tables RLUT and BLUT of the R and B modulators.

The G modulator includes a third operation unit 98. The third operation unit 98 adds a difference WG between G data of the current frame and G data of a previous frame to the output of the look-up table RLUT of the R modulator or the output of the look-up table BLUT of the B modulator when the G data of the current frame becomes greater than the G data of the previous frame and subtracts the difference WG from the output of the look-up table RLUT of the R modulator or the output of the look-up table BLUT of the B modulator when the G data of the current frame becomes smaller than the G data of the previous frame to output modulated G data MG.

Figure 11:
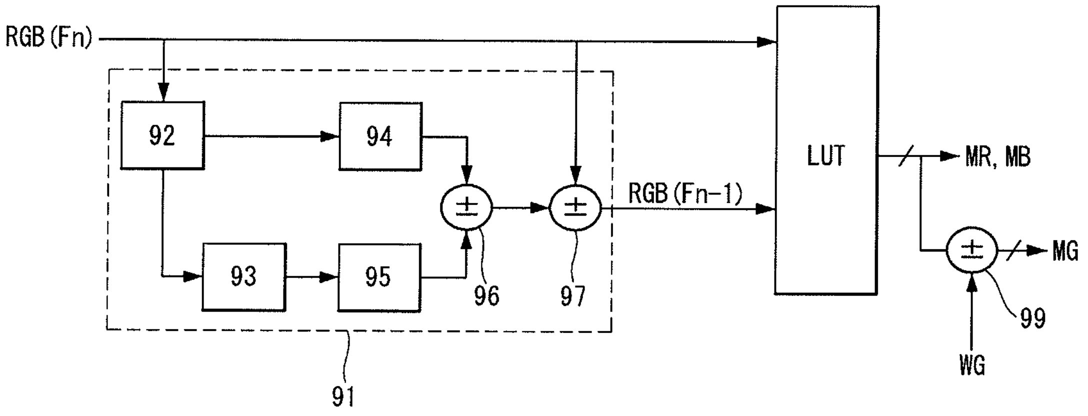
FIG. 11 shows the OD compensation unit illustrated in FIG. 4 according to a third embodiment of this document.

FIG. 11 illustrates the OD compensation unit 17 according to a third embodiment of this document.

Referring to FIG. 11, the OD compensation unit 17 includes a data compression unit 91, a look-up table LUT and a third operation unit 99.

The data compression unit 91 compresses and decompresses R data, G data and B data to output previous frame data RGB(Fn−1). The look-up table LUT sets modulation values having the same OD rate for the R data, the G data and the B data. The third operation unit 99 adds or subtracts an OD rate difference corresponding to a response time difference between the G data and the R data or B data to or from the output of the look-up table LUT to output modulated G data MG. The third operation unit 99 adds a difference WG between G data of the current frame and G data of a previous frame to the output of the look-up table LUT when the G data of the current frame becomes greater than the G data of the previous frame and subtracts the difference WG from the output of the look-up table LUT when the G data of the current frame becomes smaller than the G data of the previous frame.

The previous embodiments describe the use of a look-up table. However, it is also possible to convert the values of the look-up table (LUT) into an algorithm for processing by a processor. Thus, in an alternative embodiment, one or more over-driving (OD) compensation units may compensate respective R, G, and B data with a processor that does not use a LUT.

In one embodiment, the response characteristics of the over-driving (OD) compensation units are pre-set upon manufacture. However, in another embodiment, one or more of the over-driving (OD) compensation units may user-adjustable for testing, tuning or other purposes.

Although embodiments have been described with reference to a number of illustrative embodiments thereof, it should be understood that numerous other modifications and embodiments can be devised by those skilled in the art that will fall within the scope of the principles of the this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display, comprising:

a first over-driving (OD) compensation unit configured to compensate red data (R data) at a first OD rate;

a second OD compensation unit configured to compensate green data (G data) at a second OD rate; and a third OD compensation unit configured to compensate blue data (B data) at a third OD rate, wherein the second OD rate is different than the first OD rate and the third OD rate, wherein the first over-driving (OD) compensation unit, the second OD compensation unit, and the third OD compensation unit comprise:

a data compression and decompression unit configured to receive an input RGB signal of a current frame; and an RGB look-up table LUT configured to:

store RGB data modulation values set according to a difference between previous frame RGB data and current frame RGB data, and modulate the input RGB signal of a current frame with a modulation value selected from the RGB LUT using the RGB data of the current frame and RGB data of a previous frame as LUT addresses, wherein the RGB LUT includes an R LUT, a G LUT and a B LUT, and wherein the data compression and decompression unit comprises:

an R data compression and decompression unit connected to the R LUT;

a G data compression and decompression unit connected to the G LUT; and a B data compression and decompression unit connected to the B LUT, each compression and decompression unit including:

a data compressor configured to compress corresponding RGB data of the current frame, a frame memory connected to the data compressor, a first decompression unit connected to the data compressor, a second data decompression unit connected to the frame memory, a first operation unit connected to the first and second decompression units and configured to compare corresponding RGB data of the current frame, received from the first data decompression unit, with corresponding RGB data of the previous frame, received from the second data decompression unit, and a second operation unit connecting the first operation unit to the corresponding RGB LUT, the second operation unit configured to add or subtract a difference received from the first operation unit to or from uncompressed RGB data of the current frame to recreate the RGB of the previous frame and output the recreated RGB data of the previous frame to the corresponding RGB LUT.

2. The LCD of claim 1, wherein one of the first, second and third OD rate is user-adjustable.

3. The LCD of claim 1, wherein the second OD rate is set differently from the first OD rate and the third OD rate such that a response time of the G data is substantially equal to one of a response time of the B data and a response time of the R data.

4. The LCD of claim 1, wherein the second OD rate is higher than the first OD rate and the third OD rate.

5. The LCD of claim 1, wherein the first OD rate and the third OD rate are either different or are substantially the same.

6. The LCD of claim 1, wherein the second OD rate is set to a value corresponding to a difference between a response time of the G data and a response time of one of the R and B data.

7. The LCD of claim 6, wherein the difference between the response time of the G data and the response time of one of the R and B data is in the range of 0.26 to 0.27 ms.

8. A liquid crystal display, comprising:

an LCD panel having data lines and gate lines;

a backlight unit configured to supply light to the LCD panel;

a data driving circuit connected to the data lines of the LCD panel;

a gate driving circuit connected to the gate lines of the LCD panel;

a timing controller configured to receive a timing signal, the timing controller operatively connected to and configured to control the data driving circuit and the gate driving circuit in accordance with the timing signal; and an over-driving (OD) compensation unit operatively connected to the timing controller and configured to respectively modulate red (R) data, green (G) data and blue (B) data at respective first, second and third OD rates and to supply corresponding OD compensated RGB digital video data to the timing controller, wherein the second OD rate is different from one of the first and third OD rates, wherein the OD compensation unit comprises:

a data compression and decompression unit configured to receive an input RGB signal of a current frame; and an RGB look-up table LUT configured to:

store RGB data modulation values set according to a difference between previous frame RGB data and current frame RGB data, and modulate the input RGB signal of a current frame with a modulation value selected from the RGB LUT using the RGB data of the current frame and RGB data of a previous frame as LUT addresses, wherein the RGB LUT includes an R LUT, a G LUT and a B LUT, and wherein the data compression and decompression unit comprises:

an R data compression and decompression unit connected to the R LUT;

a G data compression and decompression unit connected to the G LUT; and a B data compression and decompression unit connected to the B LUT, each compression and decompression unit including:

a data compressor configured to compress corresponding RGB data of the current frame, a frame memory connected to the data compressor, a first decompression unit connected to the data compressor, a second data decompression unit connected to the frame memory, a first operation unit connected to the first and second decompression units and configured to compare corresponding RGB data of the current frame, received from the first data decompression unit, with corresponding RGB data of the previous frame, received from the second data decompression unit, and a second operation unit connecting the first operation unit to the corresponding RGB LUT, the second operation unit configured to add or subtract a difference received from the first operation unit to or from uncompressed RGB data of the current frame to recreate the RGB of the previous frame and output the recreated RGB data of the previous frame to the corresponding RGB LUT.

9. The liquid crystal display of claim 8, wherein the second operation unit is configured to add the output of the first operation unit to the RGB data of the current frame when the RGB data of the current frame is greater than the RGB data of the previous frame, and to subtract the output of the first operation unit from the RGB data of the current frame when the RGB data of the current frame is smaller than the RGB data of the previous frame.

10. The liquid crystal display of claim 8, further comprising:

a third operation unit configured to add or subtract an output of the B LUT to or from an output of the G LUT.

11. The liquid crystal display of claim 8, wherein the data compression and decompression unit comprises a single RGB data compression and decompression unit, and wherein the RGB LUT comprises a single RGB LUT, the liquid crystal display further comprising:

a third operation unit configured to add or subtract an OD rate difference corresponding to a response time difference between the G data and the R data or a response time difference between the G data and the B data to or from an output of the single RGB LUT.

12. The LCD of claim 8, wherein the second OD rate is set differently from the first OD rate and the third OD rate such that a response time of the G data is substantially equal to one of a response time of the B data and a response time of the R data.

13. The LCD of claim 8, wherein the second OD rate is higher than the first OD rate and the third OD rate.

14. The LCD of claim 8, wherein the first OD rate and the third OD rate are either different or are substantially the same.

15. The LCD of claim 8, wherein one of the first, second and third OD rate is user-adjustable.

16. The LCD of claim 8, wherein the second OD rate is set to a value corresponding to a difference between a response time of the G data and a response time of one of the R and B data.

17. The LCD of claim 16, wherein the difference between the response time of the G data and the response time of one of the R and B data is in the range of 0.26 to 0.27 ms.

* * * * *